US012676304B2

(12) United States Patent

Su et al.

(10) Patent No.: US 12,676,304 B2

(45) Date of Patent: Jul. 7, 2026

(54) NANO-SILICON COMPOSITE MATERIAL AND PREPARATION METHOD THEREOF, ELECTRODE MATERIAL, AND BATTERY

(71) Applicant: HUAWEI TECHNOLOGIES CO., LTD., Shenzhen (CN)

(72) Inventors: Hang Su, Shenzhen (CN); Yujing Sha, Shenzhen (CN); Shengan Xia, Shenzhen (CN); Fengchao Xie, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 670 days.

(21) Appl. No.: 18/189,268

(22) Filed: Mar. 24, 2023

(65) Prior Publication Data

US 2023/0231115 A1 Jul. 20, 2023

Related U.S. Application Data

(63) Continuation of application No. PCT/CN2021/097038, filed on May 29, 2021.

(30) Foreign Application Priority Data

Sep. 27, 2020 (CN) .......................... 202011034975.8

(51) Int. Cl.
H01M 4/36 (2006.01)
H01M 4/02 (2006.01)
(Continued)

(52) U.S. Cl.
CPC ......... H01M 4/366 (2013.01); H01M 4/0471 (2013.01); H01M 4/386 (2013.01); (Continued)

(58) Field of Classification Search
CPC .... H01M 4/366; H01M 4/0471; H01M 4/386; H01M 4/5825; H01M 10/0525; H01M 2004/021
(Continued)

(56) References Cited

U.S. PATENT DOCUMENTS 10,797,303 B2 * 10/2020 Cho ........................ H01M 4/58
2021/0328215 A1 * 10/2021 Zhang ................... H01M 4/366
(Continued)

FOREIGN PATENT DOCUMENTS

CN 102122708 A * 7/2011 .......... H01M 10/052
CN 102214824 A 10/2011
(Continued)

OTHER PUBLICATIONS

English translation of Written Opinion for PCT/CN2021/097038. (Year: 2021).*
(Continued)

*Primary Examiner* — Patricia L. Hailey

(57) ABSTRACT

In fields related to battery cathode material technologies, a nano-silicon composite material and a preparation method thereof, an electrode material, and a battery are provided to resolve large volume expansion of a cathode material of a battery and a serious side reaction with an electrolyte. The nano-silicon composite material includes a core, a first coating layer, and a second coating layer. The core includes a nano-silicon crystal. The first coating layer covers a surface of the core. The first coating layer is of a porous structure. A material of the first coating layer includes bisilicate and silicon oxide in a deoxidized state. The second coating layer covers a surface of the first coating layer. A material of the second coating layer includes silicon dioxide in a deoxidized state.

22 Claims, 5 Drawing Sheets

02

(51) Int. Cl.
H01M 4/04        (2006.01)
H01M 4/38        (2006.01)
H01M 4/58        (2010.01)
H01M 10/0525   (2010.01)

(52) U.S. Cl.
CPC .....   H01M 4/5825 (2013.01); H01M 10/0525
(2013.01); *H01M 2004/021* (2013.01)

(58) Field of Classification Search
USPC ...................................... 429/231.95; 428/403
See application file for complete search history.

(56) References Cited

U.S. PATENT DOCUMENTS

| | | | | |
|---|---|---|---|---|
| 2022/0271289 A1* | 8/2022 | Lee | .................... | H01M 4/483 |
| 2023/0268494 A1* | 8/2023 | Zhong | .................. | H01M 4/364 |
| | | | | 429/218.1 |

FOREIGN PATENT DOCUMENTS

| | | | | | |
|---|---|---|---|---|---|
| CN | 103904306 A | * | 7/2014 | ............ | H01M 4/386 |
| CN | 107534136 A | | 1/2018 | | |
| CN | 110024188 A | | 7/2019 | | |
| CN | 110556529 A | * | 12/2019 | ............ | H01M 4/483 |
| CN | 111129455 A | | 5/2020 | | |
| CN | 111430677 A | * | 7/2020 | ........ | H01M 10/0525 |
| CN | 111584848 A | | 8/2020 | | |

OTHER PUBLICATIONS

Extended European Search Report dated Jul. 15, 2024, issued for European Application No. 21870849.3 (8 pages).
Office Action dated Jul. 3, 2023, issued for Chinese Application No. 202011034975.8 (7 pages).

* cited by examiner

01

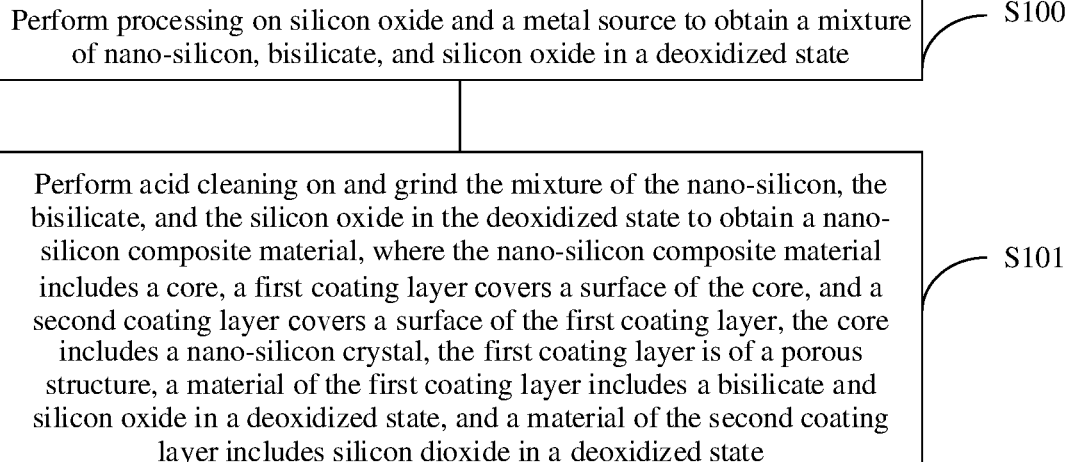

| | |
|---|---|
| Perform processing on silicon oxide and a metal source to obtain a mixture of nano-silicon, bisilicate, and silicon oxide in a deoxidized state | S100 |
| Perform acid cleaning on and grind the mixture of the nano-silicon, the bisilicate, and the silicon oxide in the deoxidized state to obtain a nano-silicon composite material, where the nano-silicon composite material includes a core, a first coating layer covers a surface of the core, and a second coating layer covers a surface of the first coating layer, the core includes a nano-silicon crystal, the first coating layer is of a porous structure, a material of the first coating layer includes a bisilicate and silicon oxide in a deoxidized state, and a material of the second coating layer includes silicon dioxide in a deoxidized state | S101 |

FIG. 6

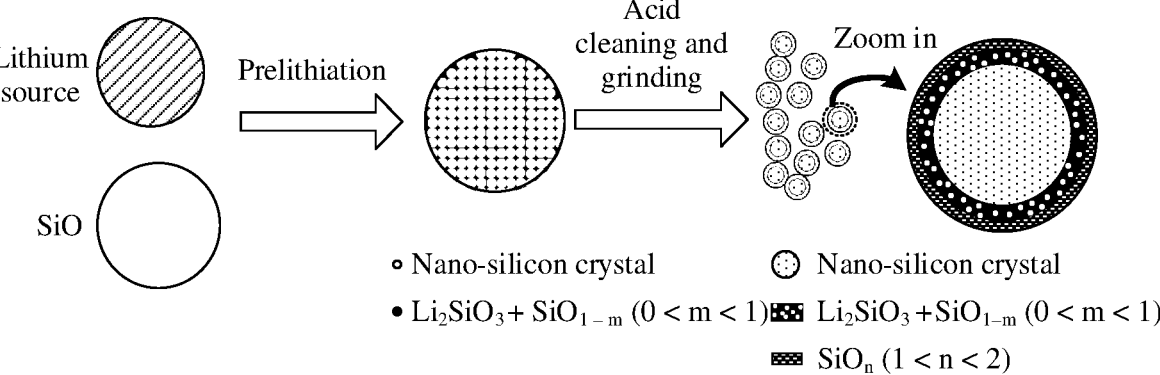

Lithium source

SiO

Prelithiation

Acid cleaning and grinding

Zoom in o Nano-silicon crystal            ⊙ Nano-silicon crystal

• $Li_2SiO_3 + SiO_{1-m}$ $(0 < m < 1)$      $Li_2SiO_3 + SiO_{1-m}$ $(0 < m < 1)$ $SiO_n$ $(1 < n < 2)$

NANO-SILICON COMPOSITE MATERIAL AND PREPARATION METHOD THEREOF, ELECTRODE MATERIAL, AND BATTERY

CROSS-REFERENCE TO RELATED APPLICATIONS

This application is a continuation of International Application No. PCT/CN2021/097038, filed on May 29, 2021, which claims priority to Chinese Patent Application No. 202011034975.8, filed on Sep. 27, 2020. The disclosures of the aforementioned applications are hereby incorporated by reference in their entireties.

TECHNICAL FIELD

This disclosure relates to the field of battery cathode material technologies, and in particular, to a nano-silicon composite material and a preparation method thereof, an electrode material, and a battery.

BACKGROUND

A lithium-ion battery is used as an example. Anode and cathode materials of the lithium-ion battery are main parts for fulfilling an energy storage function, and directly reflect energy density, cycle performance, and safety performance of an electrochemical cell. Because lithium cobaltate (LCO), as an anode material, has reached a maximum limit of use (4.4 V, compaction density: 4.2 $g/cm^3$) of the anode material, a capacity brought into play of a cathode plays an important role in improving the energy density of the entire electrochemical cell.

However, an actual gram capacity of a graphite cathode of a conventional lithium-ion battery is 360 mAh/g, which is close to a theoretical value (372 mAh/g). Therefore, it is necessary to develop a new high-capacity cathode material. A silicon-based material is one of the most studied cathode materials as an alternative to graphite. Based on different degrees of reactions, silicon and lithium may produce different products, such as $Li_7Si_3$, $Li_{13}Si_4$, $Li_{22}$ $S_{15}$, and $Li_{12}Si_{17}$. A Li4.4Si alloy formed by inserting lithium into silicon has a theoretical gram capacity of 4200 mAh/g, and is a cathode material with a theoretically maximum capacity. However, a silicon-based material shown in FIG. 1 undergoes severe volume expansion (0% to 300%) and contraction in a lithium insertion and extraction reaction process, causing damage and pulverization of a structure of an electrode material; and a silicon surface and an electrolyte continuously generate a new solid electrolyte interface (SEI) film, resulting in electrolyte exhaustion and rapid battery capacity attenuation.

SUMMARY

Embodiments of this disclosure provide a nano-silicon composite material and a preparation method thereof, an electrode material, and a battery, to resolve large volume expansion of a cathode material of a battery and a serious side reaction with an electrolyte.

To achieve the foregoing objective, this disclosure uses the following technical solutions.

According to a first aspect, a nano-silicon composite material is provided. The nano-silicon composite material includes a core, a first coating layer, and a second coating layer. The core includes a nano-silicon crystal. The first coating layer covers a surface of the core. The first coating layer is of a porous structure. A material of the first coating layer includes bisilicate and silicon oxide in a deoxidized state. The second coating layer covers a surface of the first coating layer. A material of the second coating layer includes silicon dioxide in a deoxidized state. For example, a chemical formula of the silicon oxide in the deoxidized state is $SiO_{1-m}$, where $0<m<1$. A chemical formula of the silicon dioxide in the deoxidized state is $SiO_n$, where $1<n<2$. A ratio of silicon atoms to oxygen atoms in a molecular structure of the silicon oxide (SiO, also referred to as silicon monoxide or silicon oxide (II)) is 1:1. The silicon oxide in the deoxidized state has fewer oxygen atoms. Therefore, a ratio of silicon atoms to oxygen atoms in a molecular structure of the silicon oxide in the deoxidized state is 1:m, where $0<m<1$. A ratio of silicon atoms to oxygen atoms in a molecular structure of the silicon dioxide ($SiO_2$) is 1:2. The silicon dioxide in the deoxidized state has fewer oxygen atoms. Therefore, a ratio of silicon atoms to oxygen atoms in a molecular structure of the silicon dioxide in the deoxidized state is 1:n, where $1<n<2$. The core of the nano-silicon composite material includes a nano-silicon crystal, and a size of the nano-silicon crystal is small. During a battery charging and discharging process, namely insertion and extraction reactions of a metal ion (for example, a lithium ion), this can effectively reduce volume expansion, reduce mechanical fatigue of a material, and prolong a cycle life. In addition, because the first coating layer is of the porous structure, the first coating layer can perform a buffer function when the core expands and shrinks, to alleviate internal stress of the core, and maintain stability of the structure and integrity of the second coating layer. On this basis, because the second coating layer covers the surface of the first coating layer, and a material of the second coating layer includes the silicon dioxide in the deoxidized state, the second coating layer can block an electrolyte, and reduce or eliminate a side reaction between the electrolyte and the silicon.

In a possible implementation, a particle size of the nano-silicon composite material is 10 nm to 150 nm.

In a possible implementation, a particle size of the core is 10 nm to 130 nm.

In a possible implementation, a thickness of the first coating layer is 0.1 nm to 10 nm.

In a possible implementation, a thickness of the second coating layer is 0.1 nm to 10 nm.

In a possible implementation, a proportion of mass of the nano-silicon crystal to mass of the nano-silicon composite material is 70% to 85%.

In a possible implementation, a proportion a of mass of the bisilicate to mass of the nano-silicon composite material meets $0\%<a\leq7.5\%$.

In a possible implementation, a proportion b of mass of the silicon oxide to mass of the nano-silicon composite material meets $0\%<b\leq7.5\%$.

In a possible implementation, a proportion c of mass of the silicon dioxide to mass of the nano-silicon composite material meets $0\%<c\leq15\%$.

In a possible implementation, the bisilicate includes lithium metasilicate. In this case, because the bisilicate includes the lithium metasilicate, the nano-silicon composite material can be used in a lithium-ion battery.

According to a second aspect, an electrode material is provided. The electrode material includes a mixture of the foregoing nano-silicon composite material, graphite, and carbon. The electrode material has same technical effect as that in the foregoing embodiment, and details are not described herein again.

In a possible implementation, a proportion of mass of the nano-silicon composite material to mass of the electrode material is 3% to 60%.

According to a third aspect, a battery is provided, including an electrochemical cell, a corresponding connecting accessory, and a circuit. The electrochemical cell includes an anode, a cathode, an electrolyte, and a separator. The cathode includes the foregoing electrode material. The battery has same technical effect as that in the foregoing embodiment, and details are not described herein again.

According to a fourth aspect, a preparation method of a nano-silicon composite material is provided. The preparation method of a nano-silicon composite material includes the following steps: performing processing on silicon oxide and a metal source to obtain a mixture of nano-silicon, bisilicate, and silicon oxide in a deoxidized state; and performing acid cleaning on and grinding the mixture of the nano-silicon, the bisilicate, and the silicon oxide in the deoxidized state to obtain a nano-silicon composite material. The nano-silicon composite material includes a core, a first coating layer covering a surface of the core, and a second coating layer covering a surface of the first coating layer. The core includes a nano-silicon crystal. The first coating layer is of a porous structure. A material of the first coating layer includes bisilicate and silicon oxide in a deoxidized state. A material of the second coating layer includes silicon dioxide in a deoxidized state. The core of the prepared nano-silicon composite material includes a nano-silicon crystal, and a size of the nano-silicon crystal is small. During a battery charging and discharging process, namely insertion and extraction reactions of a metal ion (for example, a lithium ion), this can effectively reduce volume expansion, reduce mechanical fatigue of a material, and prolong a cycle life. In addition, because the first coating layer is of the porous structure, the first coating layer can perform a buffer function when the core expands and shrinks, to alleviate internal stress of the core, and maintain stability of the structure and integrity of the second coating layer. On this basis, because the second coating layer covers the surface of the first coating layer, and a material of the second coating layer includes the silicon dioxide in the deoxidized state, the second coating layer can block an electrolyte, and reduce or eliminate a side reaction between the electrolyte and the silicon.

In a possible implementation, the performing processing on silicon oxide and a metal source includes: evenly mixing the silicon oxide and the metal source in a solid state at a preset ratio, or introducing the metal source in a vapor state into the silicon oxide at a preset ratio, and performing roasting in a high temperature furnace in an inert atmosphere or a reducing atmosphere. When the metal source is in a solid state or a gas state, this method may be used to perform processing on the silicon oxide and the metal source.

In a possible implementation, a roasting temperature is 300° C. to 900° C.

In a possible implementation, the metal source is an organic solvent containing a metal ion. The performing processing on silicon oxide and a metal source includes: mixing, at a preset ratio, the silicon oxide and the organic solvent containing the metal ion, and reacting in an inert atmosphere or a reducing atmosphere; and cleaning and drying a reaction product. When the metal source is in a liquid state, this method may be used to perform processing on the silicon oxide and the metal source.

In a possible implementation, a reaction temperature is less than 200° C.

In a possible implementation, the preset ratio is a molar ratio that is of a metal element in the metal source to a silicon element in the silicon oxide and that is 0.1 to 1.0.

In a possible implementation, the metal source includes a lithium source, and the lithium source includes metal lithium or a lithium salt. Because the lithium source includes the metal lithium or the lithium salt, the prepared nano-silicon composite material may be used in a lithium-ion battery.

In a possible implementation, the organic solvent containing the metal ion includes an organic solvent containing a lithium ion. Because the organic solvent containing the metal ion includes the organic solvent containing the lithium ion, the prepared nano-silicon composite material may be used in a lithium-ion battery.

BRIEF DESCRIPTION OF DRAWINGS

FIG. 6 is a schematic flowchart of a preparation method of a nano-silicon composite material according to an embodiment of this disclosure;

FIG. 7 is a schematic diagram of a structure of a preparation method process of a nano-silicon composite material according to an embodiment of this disclosure.

REFERENCE NUMERALS

01—battery; 02—nano-silicon composite material; 1—anode; 2—cathode; 3—electrolyte; 4—separator; 5—side reaction product; 10—core; 11—anode collector; 12—anode material; 20—first coating layer; 30—second coating layer; 21—cathode collector; and 22—cathode material.

DESCRIPTION OF EMBODIMENTS

The following describes technical solutions in embodiments of this disclosure with reference to the accompanying drawings in embodiments of this disclosure. It is clear that the described embodiments are merely some rather than all of embodiments of this disclosure.

Terms such as "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this disclosure, unless otherwise stated, "a plurality of" means two or more than two.

An embodiment of this disclosure provides a battery. The battery may be a lithium-ion battery, a sodium-ion battery, a magnesium-ion battery, or the like. A specific form of the battery is not specially limited in embodiments of this disclosure. For ease of description, a lithium-ion battery is used as an example in the following for description.

Figure 1:
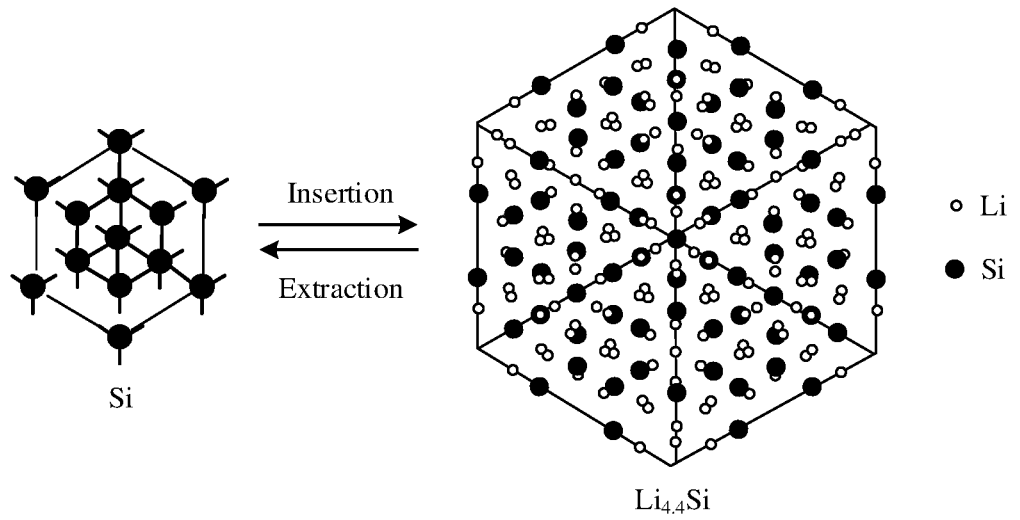
FIG. 1 is a schematic diagram of a structure of lithium insertion and extraction reactions of a silicon-based material according to the conventional technology.
Figure 2:
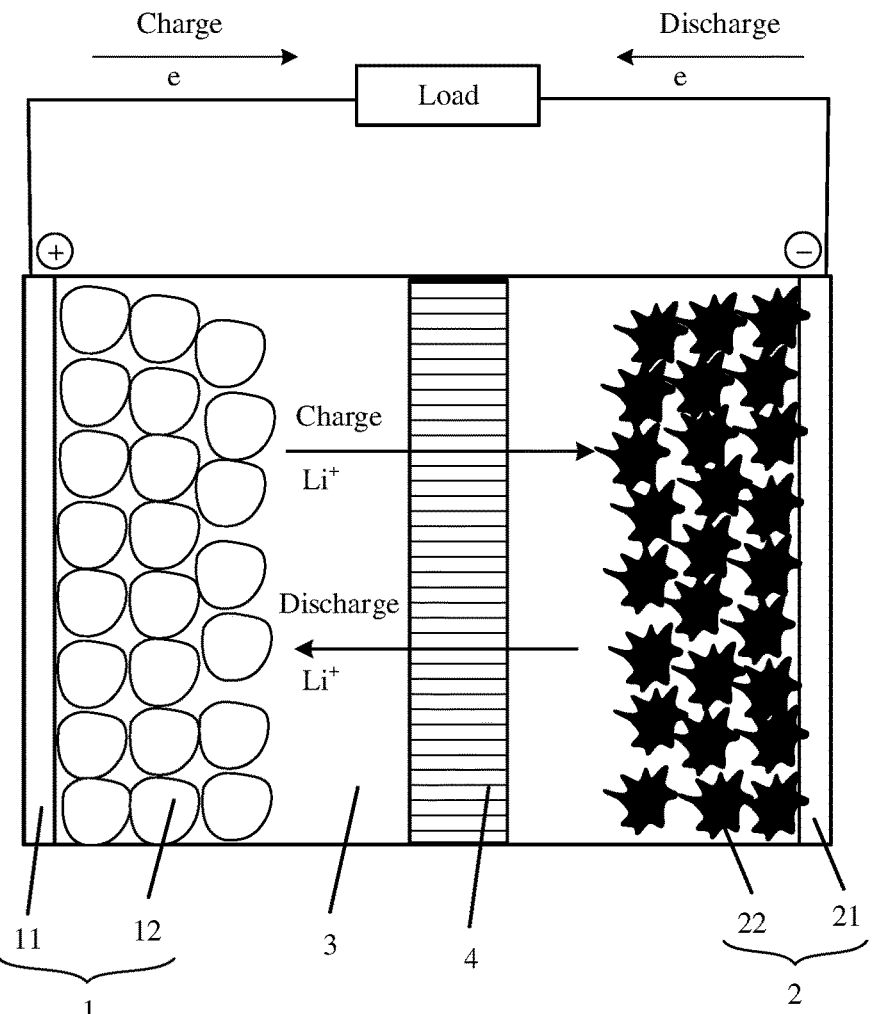
FIG. 2 is a schematic diagram of a structure of a battery according to an embodiment of this disclosure.

As shown in FIG. 2, a main structure of the battery 01 includes an electrochemical cell, a corresponding connecting accessory (for example, a load), and a circuit. The electrochemical cell includes an anode 1, a cathode 2, an electrolyte 3, and a separator 4.

The anode 1 includes an anode collector (also referred to as an anode plate) 11 and anode slurry coated on a surface of the anode collector 11. The anode slurry includes an anode material 12, a conductive agent, a bonding agent, and the like. The anode collector 11 may be, for example, aluminum foil. The anode material 12 may be, for example, lithium cobaltate. The conductive agent in the anode slurry may be, for example, super P (SP). The bonding agent in the anode slurry may be, for example, polyvinylidene fluoride (PVDF).

The cathode 2 includes a cathode collector (also referred to as a cathode plate) 21 and cathode slurry coated on a surface of the cathode collector 21. The cathode slurry includes a cathode material 22, a conductive agent, a bonding agent, and the like. The cathode collector 21 may be, for example, copper foil. The conductive agent in the cathode slurry may be, for example, super P. The bonding agent in the cathode slurry may be, for example, carboxymethyl cellulose (CMC) and styrene-butadiene rubber (SBR).

A lithium ion may be inserted into and extracted from the anode material 12 and the cathode material 22 to implement energy storage and release. The electrolyte 3 is a carrier for lithium ion transmission between the anode 1 and the cathode 2. The lithium ion can pass through the non-conductive separator 4, but the non-conductive separator 4 can separate the anode 1 and the cathode 2 to prevent short circuit.

A working principle of the lithium-ion battery is as follows: During charging, $Li^+$ in the anode material 12 and $Li^+$ in the electrolyte 3 aggregate to the cathode 2, to obtain an electron, which is restored to Li and inserted into the cathode material 22 of the cathode 2. During discharging, the Li inserted in the cathode material 22 of the cathode 2 loses the electron and enters the electrolyte 3, and the $Li^+$ in the electrolyte 3 moves towards the anode 1. It can be learned based on the foregoing working principle of the lithium-ion battery that the anode material 12 and the cathode material 22 are main parts for fulfilling an energy storage function, and directly reflect energy density, cycle performance, and safety performance of the electrochemical cell. Currently, lithium cobaltate has reached maximum usage of the commercial anode material 12. A maximum voltage of the lithium cobaltate is 4.4 V, and a compaction density is 4.2 g/cm³. Therefore, a capacity brought into play of the cathode material 22 is one of key factors for improving the energy density of the entire electrochemical cell.

Currently, because the silicon-based material has a high gram capacity, the silicon-based material is usually used as a cathode material of a battery. However, the silicon-based material undergoes severe volume expansion and contraction in a lithium insertion and extraction reaction process, causing damage and pulverization of a structure of the electrode material. In addition, a silicon surface and the electrolyte continuously generate a new SEI film, causing electrolyte exhaustion and rapid battery capacity attenuation.

Figure 3:
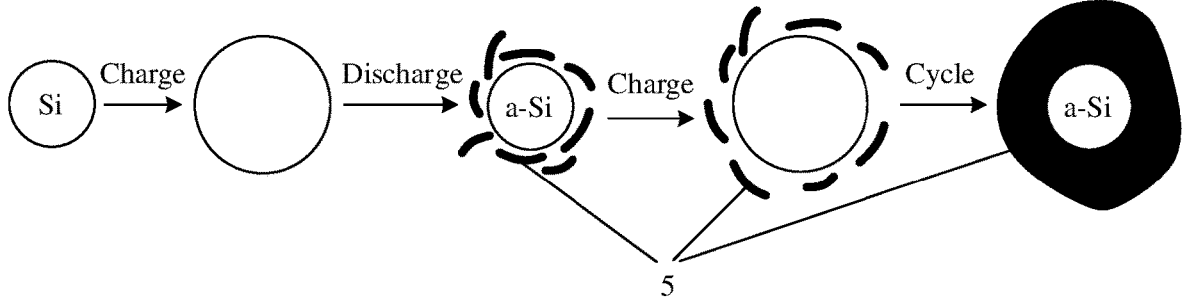
FIG. 3 is a schematic diagram of a structure of a charging and discharging process of nano-silicon according to a related technology.

To resolve the foregoing problem, in a related technology, nanocrystallization is usually used to alleviate volume expansion of silicon. However, nanocrystallization causes a high specific surface area with a feature of high probability of agglomeration and low probability of dispersion, a large contact area with the electrolyte, a serious side reaction, fast deactivation in a silicon material, fast consumption of the electrolyte, and the like. Refer to FIG. 3. In a charging and discharging process of nano-silicon, a surface of silicon reacts with an electrolyte to form a side reaction product 5. After a plurality of times of charging and discharging, the surface of silicon is covered by the formed side reaction product 5. As a result, a lithium ion cannot be inserted in a silicon material, and the silicon material is deactivated. In addition, a reaction between the silicon and the electrolyte may further cause fast consumption of the electrolyte. It should be noted that, in FIG. 3, the nano-silicon is crystalline silicon before the first charging and discharging, and after the first charging and discharging, amorphous silicon (a-Si) is formed.

Figure 4:
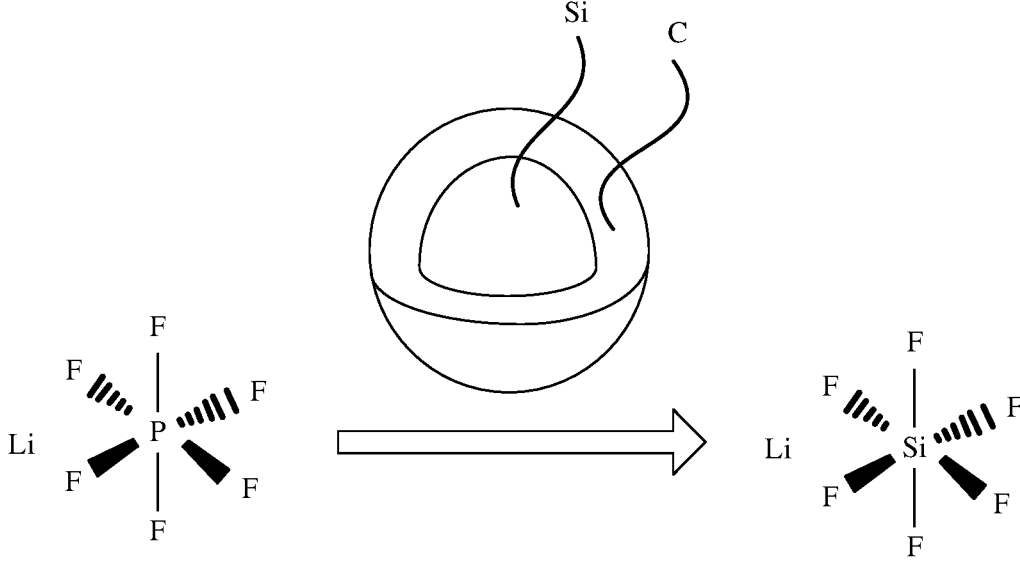
FIG. 4 is a schematic diagram of nano-silicon that has a coating layer disposed on a surface of the nano-silicon and that reacts with an electrolyte according to a related technology.

To further resolve a problem caused by nanocrystallization, as shown in FIG. 4, a coating layer (for example, a carbon (C) coating layer) is further disposed on a surface of a nano-silicon (Si) cathode material. However, carbon coating on pores of the nano-silicon (Si) cathode material cannot truly alleviate the side reaction between the silicon and the electrolyte. A latest research result shows that catalytic effect of carbon coating accelerates a reaction between the silicon and lithium hexafluorophosphate ($LiPF_6$) in the electrolyte, thereby causing a loss of active silicon and capacity attenuation.

Based on the foregoing description, an embodiment of this disclosure provides an electrode material. The electrode material may be used as the cathode material 22 in the cathode 2 of the battery 01. The electrode material includes a mixture of a nano-silicon composite material, graphite, and carbon, and the electrode material may also be referred to as a nano silicon/graphite/carbon composite material.

In some embodiments, a proportion of mass of the nano-silicon composite material in the electrode material to mass of the electrode material is 3% to 60%.

For example, a proportion of the mass of the nano-silicon composite material to the mass of the electrode material may be 3%, 20%, 40%, or 60%.

In some embodiments, a particle size of the nano-silicon composite material is 10 nm to 150 nm.

For example, the particle size of the nano-silicon composite material may be 10 nm, 30 nm, 60 nm, 100 nm, or 150 nm.

The following describes a structure of the nano-silicon composite material in detail.

Figure 5:
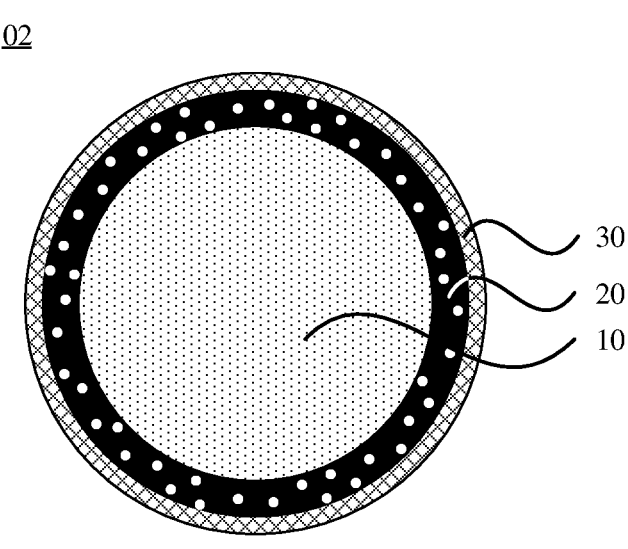
FIG. 5 is a schematic diagram of a structure of a nano-silicon composite material according to an embodiment of this disclosure.

As shown in FIG. 5, the nano-silicon composite material 02 includes a core 10, a first coating layer 20, and a second coating layer 30. The core 10 includes a nano-silicon crystal (Si cluster), and the nano-silicon crystal includes a plurality of nano-silicon atoms. The first coating layer 20 covers a surface of the core 10. The first coating layer 20 is of a porous structure. A material of the first coating layer 20 includes bisilicate and silicon oxide ($SiO_{1-m}$, $0 < m < 1$) in a deoxidized state. The second coating layer 30 covers a surface of the first coating layer 20. A material of the second coating layer 30 includes silicon dioxide ($SiO_n$, $1 < n < 2$) in a deoxidized state.

It should be noted that a ratio of silicon atoms to oxygen atoms in a molecular structure of the silicon oxide (SiO, also referred to as silicon monoxide or silicon oxide (II)) is 1:1. The silicon oxide in the deoxidized state has fewer oxygen atoms. Therefore, a ratio of silicon atoms to oxygen atoms in a molecular structure of the silicon oxide in the deoxidized state is 1:m, where $0<m<1$. A ratio of silicon atoms to oxygen atoms in a molecular structure of the silicon dioxide ($SiO_2$) is 1:2. The silicon dioxide in the deoxidized state has fewer oxygen atoms. Therefore, a ratio of silicon atoms to oxygen atoms in a molecular structure of the silicon dioxide in the deoxidized state is 1:n, where $1<n<2$.

In this case, if a size of the core 10 is excessively large, volume expansion is large in a charging and discharging process of a battery. If a size of the core 10 is excessively small, a procedure of preparing the nano-silicon composite material 02 is more difficult, causing higher costs. Based on this, in some embodiments, a particle size of the core 10 is 10 nm to 130 nm. For example, the particle size of the core 10 may be 10 nm, 20 nm, 50 nm, 100 nm, or 130 nm.

In addition, the core 10 may be, for example, in a spherical shape, a spherical-like shape, or the like.

On this basis, a thickness of the first coating layer 20 may be correspondingly adjusted according to the particle size of the core 10. When the thickness of the first coating layer 20 is set, it needs to be ensured that the first coating layer 20 can perform a buffering function, and it needs to be ensured that lithium ion insertion and extraction reactions of the core 10 in a charging and discharging process is not affected. Based on this, in some embodiments, a thickness of the first coating layer 20 is 0.1 nm to 10 nm.

For example, the thickness of the first coating layer 20 may be 0.1 nm, 1 nm, 5 nm, or nm.

In addition, a thickness of the second coating layer 30 may also be correspondingly adjusted according to the particle size of the core 10. When the thickness of the second coating layer 30 is set, it needs to be ensured that the second coating layer 30 can block a reaction between the electrolyte and silicon, and it needs to be ensured that lithium ion insertion and extraction reactions of the core 10 in a charging and discharging process is not affected. Based on this, in some embodiments, a thickness of the second coating layer 20 is 0.1 nm to 10 nm.

For example, the thickness of the second coating layer 20 may be 0.1 nm, 1 nm, 5 nm, or 10 nm.

It should be understood that because the first coating layer 20 covers the surface of the core 10, and the second coating layer 30 covers the surface of the first coating layer 20, a shape of the first coating layer 20 and a shape of the second coating layer 30 are related to a shape of the core 10. For example, the core 10 is in a spherical shape, and a cross section of the first coating layer 20 and a cross section of the second coating layer 30 are in a circular shape.

In some embodiments of this disclosure, a proportion of mass of the nano-silicon crystal to mass of the nano-silicon composite material is 70% to 85%. In other words, a ratio of moles of the nano-silicon crystal to a sum of moles of the bisilicate, the silicon oxide in the deoxidized state, and the silicon dioxide in the deoxidized state is 7:3 to 4:1.

For example, a proportion of the mass of the nano-silicon crystal to the mass of the nano-silicon composite material may be 70%, 80%, or 85%.

In some embodiments of this disclosure, a proportion a of mass of the bisilicate in the first coating layer 20 to mass of the nano-silicon composite material meets $0<a\leq7.5\%$.

For example, a proportion of the mass of the bisilicate to the mass of the nano-silicon composite material may be 2%, 5%, or 7.5%.

In some examples, the bisilicate includes lithium metasilicate ($Li_{2x}Si_yO_{x+2y}$, where x and y are positive integers). When the bisilicate is lithium metasilicate, the battery provided in this embodiment of this disclosure is a lithium-ion battery. The lithium-ion battery has high energy density, a fast charge and discharge speed, a long service life, and low self-discharge.

It should be noted that the foregoing lithium metasilicate may be, for example, at least one of $Li_2SiO_3$, $Li_2Si_2O_5$, or $Li_4SiO_4$. When the nano-silicon composite material is used, the nano-silicon composite material needs to be mixed with graphite and carbon to form an electrode material. Then, the electrode material is mixed with a conductive agent, a bonding agent, and the like to form slurry and is coated on the cathode collector 21. $Li_2SiO_3$ is difficult to dissolve in water, and is not affected by a water-based slurry preparation process in a slurry preparation process. Therefore, in some examples, the lithium metasilicate is $Li_2SiO_3$.

In some embodiments of this disclosure, a proportion b of mass of the silicon oxide in the first coating layer 20 to mass of the nano-silicon composite material meets $0\%<b\leq7.5\%$.

For example, a proportion of the mass of the silicon oxide to the mass of the nano-silicon composite material may be 2%, 5%, or 7.5%.

Based on this, a proportion of the mass of the bisilicate to the mass of the nano-silicon composite material may be the same as or different from a proportion of the mass of the silicon oxide to the mass of the nano-silicon composite material.

In some embodiments of this disclosure, a proportion c of mass of the silicon dioxide to mass of the nano-silicon composite material meets $0\%<c\leq15\%$.

For example, a proportion of the mass of the silicon dioxide to the mass of the nano-silicon composite material may be 1%, 5%, 10%, or 15%.

An embodiment of this disclosure provides a nano-silicon composite material 02. The nano-silicon composite material 02 includes a core 10, a first coating layer 20, and a second coating layer 30. The core 10 includes a nano-silicon crystal. The first coating layer 20 covers a surface of the core 10. The first coating layer 20 is of a porous structure. A material of the first coating layer 20 includes bisilicate and silicon oxide in a deoxidized state. The second coating layer 30 covers a surface of the first coating layer 20. A material of the second coating layer 30 includes silicon dioxide in a deoxidized state. The core 10 of the nano-silicon composite material 02 includes a nano-silicon crystal, and a size of the nano-silicon crystal is small. During a battery charging and discharging process, namely insertion and extraction reactions of a metal ion (for example, a lithium ion), this can effectively reduce volume expansion, reduce mechanical fatigue of a material, and prolong a cycle life. In addition, because the first coating layer 20 is of the porous structure, the first coating layer 20 can perform a buffer function when the core 10 expands and shrinks, to alleviate internal stress of the core 10, and maintain stability of the structure and integrity of the second coating layer 30. On this basis, because the second coating layer 30 covers the surface of the first coating layer 20, and the material of the second coating layer 30 includes the silicon dioxide in the deoxidized state, the second coating layer 30 can block an electrolyte, and reduce or eliminate a side reaction between the electrolyte and silicon.

An embodiment of this disclosure further provides a preparation method of a nano-silicon composite material 02, which may be used to prepare the nano-silicon composite material 02. As shown in FIG. 6, the preparation method of a nano-silicon composite material 02 includes the following steps.

S100: Perform processing on silicon oxide and a metal source to obtain a mixture of nano-silicon, bisilicate, and silicon oxide in a deoxidized state.

In this case, the silicon oxide and the metal source may be processed based on a form of the metal source. The following provides examples of three processing manners of the silicon oxide and the metal source.

When the metal source is in a solid state, the silicon oxide and the metal source may be processed in a manner 1. Specifically, the manner 1 is as follows: The silicon oxide and the metal source in the solid state are evenly mixed at a preset ratio, and then roasted in a high temperature furnace in an inert atmosphere or a reducing atmosphere.

It may be understood that the silicon oxide and the metal source in the solid state may be evenly mixed at the preset ratio, transferred to a saggar, and then transferred from the saggar to the high temperature furnace in the inert atmosphere or the reducing atmosphere for roasting.

When the metal source is in a gas state, the silicon oxide and the metal source may be processed in a manner 2. Specifically, the manner 2 is as follows: The metal source in a vapor state is introduced into the silicon oxide at a preset ratio, and both are roasted in a high temperature furnace in an inert atmosphere or a reducing atmosphere.

When the silicon oxide and the metal source are processed in the manner 1 or the manner 2, in some embodiments, a roasting temperature is 300° C. to 900° C.

For example, the roasting temperature may be, for example, 300° C., 500° C., 700° C., or 900° C.

In addition, the high temperature furnace used in the foregoing manner 1 and manner 2 may be, for example, a vacuum furnace, a box-type furnace, a rotary furnace, or a tube furnace.

When the silicon oxide and the metal source are processed in the manner 1 or the manner 2, in some embodiments, the metal source is simple metal or a salt that contains a metal ion. When the nano-silicon composite material is used in a cathode material of a lithium-ion battery, the metal source includes a lithium source, and the lithium source includes metal lithium or a lithium salt.

For example, the lithium salt includes one or more of LiH, LiAlH$_4$, Li$_2$CO$_3$, LiNO$_3$, LiAc, and LiOH.

When the metal source is in a liquid state, the metal source is an organic solvent including a metal ion, and the silicon oxide and the metal source may be processed in a manner 3. Specifically, the manner 3 is as follows: The silicon oxide and the organic solvent containing the metal ion are mixed at a preset ratio, and reacted in an inert atmosphere or a reducing atmosphere; and then a reaction product is cleaned and dried.

In some embodiments, a reaction temperature is less than 200° C.

For example, the reaction temperature may be 20° C., 50° C., 100° C., or 150° C.

In this case, the organic solvent may be, for example, at least one of alcohol, ether, or ketone.

In addition, the reaction product may be cleaned by using deionized water, to remove the organic solvent.

When the nano-silicon composite material is used in a cathode material of a lithium-ion battery, the organic solvent containing the metal ion includes an organic solvent including a lithium ion.

The inert atmosphere in the foregoing manner 1, manner 2, and manner 3 may be, for example, at least one of argon (Ar), helium (He), neon (Ne), nitrogen (N$_2$), or xenon (Xe). The reducing atmosphere may be, for example, at least one of hydrogen (H$_2$), ethylene (C$_2$H$_4$), or methane (CH$_4$).

It should be noted that, in some embodiments, the preset ratio in the foregoing manner 1, manner 2, and manner 3 is a molar ratio that is of a metal element in the metal source to a silicon element in the silicon oxide and that is 0.1 to 1.0. In other words, $0.1 \leq nX/nSi \leq 1.0$, where X represents the metal element. For example, a molar ratio of a lithium element in the lithium source to the silicon element in the silicon oxide is 0.1 to 1.0. In other words, $0.1 \leq nLi/nSi \leq 1.0$.

On this basis, when processing is performed on the silicon oxide and the metal source, a structure of a product formed by reaction may be adjusted by controlling a reaction condition (for example, the ratio of the metal element in the metal source to the silicon element in the silicon oxide, and the reaction temperature), to convert the silicon oxide into a silicon-oxygen compound (for example, a lithium-silicon-oxygen compound Li$_2$SiO$_3$) that is specifically formed and that contains a metal ion. For example, a type of lithium metasilicate (or lithium bisilicate) may be adjusted by controlling a ratio, a reaction temperature, and the like of the lithium element in the lithium source and the silicon element in the silicon oxide. A lithium-rich reaction and a low-temperature reaction are conducive to forming Li$_2$SiO$_3$.

S101: Perform acid cleaning on and grind the mixture of the nano-silicon, the bisilicate, and the silicon oxide in the deoxidized state to obtain a nano-silicon composite material 02, where the nano-silicon composite material 02 includes a core 10, a first coating layer 20 covering a surface of the core 10, and a second coating layer 30 covering a surface of the first coating layer 20, the core 10 includes a nano-silicon crystal, the first coating layer 20 is of a porous structure, a material of the first coating layer 20 includes bisilicate and silicon oxide in a deoxidized state, and a material of the second coating layer 30 includes silicon dioxide in a deoxidized state.

In this case, acid cleaning solution selected during acid cleaning may be, for example, one or more of sulfuric acid, hydrochloric acid, nitric acid, and hydrofluoric acid. An objective of acid cleaning is to remove a specific phase from bisilicate to form a pore. Based on the objective of acid cleaning, the selected acid cleaning solution should be highly corrosive and oxidized, and can react to the material in a targeted manner. For example, the bisilicate obtained in step S100 includes Li$_2$SiO$_3$, Li$_2$Si$_2$O$_5$, or the like. Li$_2$Si$_2$O$_5$ may be removed in a targeted manner through acid cleaning, to form a pore. The remaining bisilicate is mainly Li$_2$SiO$_3$.

It should be noted that when grinding is performed on an acid-cleaned precursor, the acid-cleaned precursor may be sent into a grinding groove of a grinding machine. The grinding groove is filled with a proper quantity of grinding media, for example, glass beads. Then, a dispersed blade in the grinding machine rotates at a high speed, so that the grinding media collides with the acid-cleaned precursor, thereby achieving dispersion effect, to further reduce a particle size of the acid-cleaned precursor. Grinding can reduce the particle size of the acid-cleaned precursor, and can form silicon dioxide in a deoxidized state on a surface of the nano-silicon composite material, that is, form the second coating layer 30.

It should be understood that after grinding is completed, the reaction product and the grinding media may be separated and discharged by using a separation method. In this case, the separation method may be, for example, at least one of a precipitation separation method, a centrifuge separation method, or a solvent separation method.

In addition, for a particle size of the core 10 in the nano-silicon composite material 02, a thickness of the first coating layer 20, and a thickness of the second coating layer 30, refer to the foregoing embodiments, and details are not described herein again. In addition, for a mass ratio of the nano-silicon crystal, the bisilicate, the silicon oxide, and the silicon dioxide, refer to the foregoing embodiments, and details are not described herein again.

An embodiment of this disclosure provides a preparation method of a nano-silicon composite material 02. The prepared nano-silicon composite material 02 includes a core 10, a first coating layer 20, and a second coating layer 30. The core 10 includes a nano-silicon crystal. The first coating layer 20 covers a surface of the core 10. The first coating layer 20 is of a porous structure. A material of the first coating layer 20 includes bisilicate and silicon oxide in a deoxidized state. The second coating layer 30 covers a surface of the first coating layer 20. A material of the second coating layer 30 includes silicon dioxide in a deoxidized state. The core 10 of the nano-silicon composite material 02 includes a nano-silicon crystal, and a size of the nano-silicon crystal is small. During a battery charging and discharging process, namely insertion and extraction reactions of a metal ion (for example, a lithium ion), this can effectively reduce volume expansion, reduce mechanical fatigue of a material, and prolong a cycle life. In addition, because the first coating layer 20 is of the porous structure, the first coating layer 20 can perform a buffer function when the core 10 expands and shrinks, to alleviate internal stress of the core 10, and maintain stability of the structure and integrity of the second coating layer 30. On this basis, because the second coating layer 30 covers the surface of the first coating layer 20, and the material of the second coating layer 30 includes the silicon dioxide in the deoxidized state, the second coating layer 30 can block an electrolyte, and reduce or eliminate a side reaction between the electrolyte and silicon.

An embodiment of this disclosure further provides a preparation method of an electrode material, including: mixing the nano-silicon composite material 02 prepared in step S100 and step S101 with graphite and carbon, to obtain an electrode material.

A proportion of mass of the nano-silicon composite material 02 to a sum of the mass of the nano-silicon composite material 02, mass of graphite, and mass of carbon is 3% to 60%.

An embodiment of this disclosure further provides a preparation method of an electrode slurry, including: dispersing and evenly stirring the foregoing prepared electrode material, a conductive agent, and a bonding agent in deionized water, to obtain electrode slurry.

In this case, the conductive agent may be, for example, SP. The bonding agent may be, for example, SBR and CMC.

An embodiment of this disclosure further provides a preparation method of a cathode, including: coating a surface of a cathode collector with the foregoing prepared electrode slurry, and drying the electrode slurry to obtain a cathode (also referred to as a cathode plate).

The cathode collector may be, for example, copper foil.

The following provides a specific embodiment to describe in detail a process of preparing a nano-silicon composite material 02, an electrode material, and a lithium-ion battery.

Refer to FIG. 7. Specific steps of preparing a nano-silicon composite material 02 are as follows.

S200: Weigh silicon oxide (SiO) and a solid-state lithium source, where a molar ratio nLi/nSi of a lithium element in the lithium source to a silicon element in the silicon oxide is 0.1 to 1.0, fully and evenly mix the weighed silicon oxide and the solid-state lithium source under protection of an Ar gas atmosphere or a mixture atmosphere of hydrogen ($H_2$) and Ar gas, and then transfer the evenly mixed silicon oxide and lithium source to a high temperature furnace protected by an inert atmosphere for high temperature roasting at 500° C. to 900° C. A reaction time period is 5 to 48 hours. After a reaction is completed, pre-lithiumized silicon oxide may be obtained. In other words, a mixture of nano-silicon, lithium metasilicate ($Li_2SiO_3$), and silicon oxide ($SiO_{1-m}$, 0<m<1) in a deoxidized state is obtained. Step S200 may also be referred to as a pre-lithiumization process.

S201: Weigh a mixture of 5 g of nano-silicon, lithium metasilicate, and silicon oxide in a deoxidized state, add excessive 1 mol/L hydrochloric acid for mixing, perform mixing at a speed of 200 r/min, perform a reaction for 12 to 24 hours, perform filtering and cleaning, and perform drying in a vacuum for 6 to 12 hours at 80° C. A dried product is transferred into a grinding machine, ground for 24 to 48 hours under protection of ethanol and Ar gas, filtered, cleaned, and dried to obtain the nano-silicon composite material 02. A core 10 of the nano-silicon composite material 02 includes a nano-silicon crystal. The first coating layer 20 covers a surface of the core 10. A material of the first coating layer 20 includes lithium metasilicate ($Li_2SiO_3$) and silicon oxide ($SiO_{1-m}$, 0<m<1) in a deoxidized state. A second coating layer 30 covers a surface of the first coating layer 20. A material of the second coating layer 30 includes silicon dioxide ($SiO_n$, 1<n<2) in a deoxidized state. Step S201 may also be referred to as an acid cleaning and grinding process.

Performance of the prepared nano-silicon composite material 02 is detected. A gram capacity of the nano-silicon composite material 02 is 2000 to 3500 mAh/g, and initial coulomb efficiency is 80% to 90%. It can be learned that the nano-silicon composite material 02 prepared in this embodiment of this disclosure has a high gram capacity, and initial coulomb efficiency is high.

The nano-silicon composite material 02 prepared by using S200 and S201 is compared with existing nano-silicon (the nano-silicon is a crystalline silicon particle with a diameter of nanometers, for example, a crystalline silicon particle with a diameter of less than 5 nm). A comparison result is shown in Table 1.

TABLE 1

|  | Particle size (d50) | Gram capacity | First-time efficiency |
| --- | --- | --- | --- |
| Nano-silicon composite material | 50 nm | 3000 mAh/g | 86% |
| Nano-silicon | 50 nm | 2800 mAh/g | 85% |

It can be learned from results in the foregoing table that the nano-silicon composite material 02 prepared in this embodiment of this disclosure has advantages in terms of a gram capacity and efficiency.

Specific steps for preparing an electrode material are as follows:

S300: Mix, based on a mass ratio of 40%:50%:10%, a nano-silicon composite material 02, graphite, and carbon that are prepared by using S200 and S201, to obtain the electrode material. The electrode material may be used as a cathode material.

Specific steps for preparing a lithium-ion battery are as follows:

S400: Disperse and evenly mix, based on a mass ratio of 95:0.3:3.2:1.5, the electrode material, a conductive agent SP, a bonding agent SBR, and a bonding agent CMC that are prepared by using S300 in deionized water, to obtain electrode slurry. Next, a surface of copper foil is coated with electrode slurry, and dried at 85° C., to obtain a cathode (namely, a cathode plate) 2. The prepared cathode 2 is used with a lithium cobaltate anode (namely, an anode plate), and a mixture of 1 mol/L of ethylene carbonate ($LiPF_6$/EC), polycarbonate (PC), diethyl carbonate (DEC), ethyl methyl carbonate (EMC) is selected as an electrolyte. A volume ratio of $LiPF_6$/EC, PC, DEC, and EMC is 1:0.3:1:1. A three-layer separator is used to manufacture a soft pack battery of about 3.7 Ah. An intermediate layer is made of polyethylene (PE). Two side layers are made of polypropylene (PP). A thickness of the three-layer separator is 10 µm.

Figure 8:
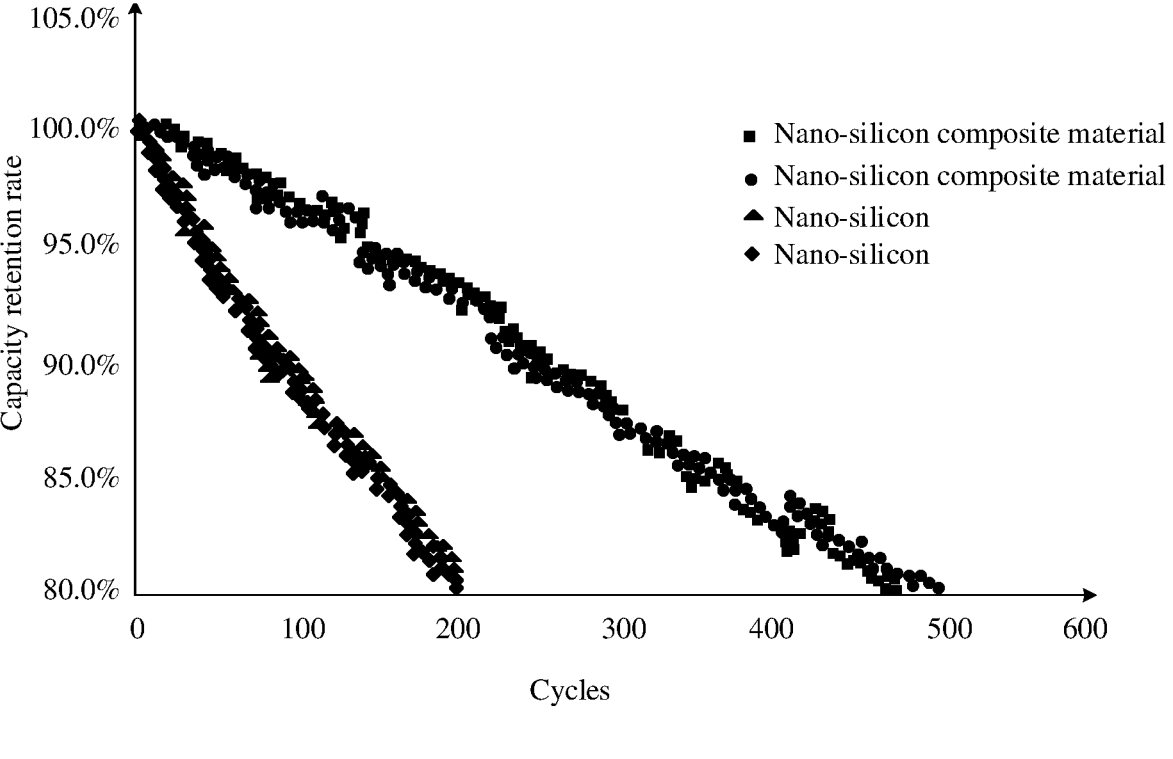
FIG. 8 is a schematic diagram of comparison of cycle performance between an electrochemical cell of a lithium-ion battery prepared by using a nano-silicon composite material and an electrochemical cell of a lithium-ion battery prepared by using nano-silicon.

To compare performance of a lithium-ion battery prepared by using the nano-silicon composite material 02 prepared according to the method provided in this embodiment of this disclosure with performance of a lithium-ion battery prepared by using nano-silicon, nano-silicon, graphite, and carbon are mixed at a mass ratio of 40%:50%:10% to obtain an electrode material. The electrode material prepared by using the nano-silicon, a conductive agent SP, a bonding agent SBR, and a bonding agent CMC are dispersed in deionized water at a mass ratio of 95:0.3:3.2:1.5, and are evenly stirred to obtain electrode slurry. Next, a surface of copper foil is coated with electrode slurry, and dried at 85° C. to obtain a cathode 2. The prepared cathode 2 is used with a lithium cobaltate anode, and a mixture of 1 mol/L of $LiPF_6$/EC, PC, DEC, and EMC is selected as an electrolyte. A volume ratio of $LiPF_6$/EC, PC, DEC, and EMC is 1:0.3: 1:1. A three-layer separator is used to manufacture a soft pack battery of about 3.7 Ah. An intermediate layer is made of PE. Two side layers are made of PP. A thickness of the three-layer separator is 10 µm. Then, cycle performance is tested on an electrochemical cell of the soft pack battery that is about 3.7 Ah and that is made by using the foregoing nano-silicon composite material 02 and an electrochemical cell of the soft pack battery that is about 3.7 Ah and that is made by using nano-silicon. A test result is shown in FIG. 8. FIG. 8 shows a plurality of sampling points obtained by testing two lithium ion soft pack batteries prepared by using the foregoing nano-silicon composite material 02 and a plurality of sampling points obtained by testing two lithium ion soft pack batteries prepared by using nano-silicon. In FIG. 8, a horizontal axis represents a quantity of cycles of charging and discharging. For example, a quantity of cycles is 500 weeks, indicating that an electrochemical cell may be charged and discharged for 500 times. A vertical axis indicates a capacity retention rate of the electrochemical cell. The cycle performance may be indicated by a quantity of cycles of charging and discharging and a capacity retention rate of an electrochemical cell. When quantities of cycles are the same, a higher capacity retention rate of the electrochemical cell indicates better cycle performance of the electrochemical cell of the lithium-ion battery.

Refer to FIG. 8. It can be learned that the electrochemical cell of the lithium-ion battery prepared by using the nano-silicon composite material 02 has excellent cycle performance. When a quantity of cycles is 500 weeks, a capacity retention rate of the electrochemical cell is 80%. However, when a quantity of cycles is 200 weeks, the capacity retention rate of the electrochemical cell of the lithium-ion battery prepared by using the nano-silicon is attenuated to 80%. In addition, when a quantity of cycles is 200 weeks, electrochemical cell expansion rates of the lithium-ion battery prepared by using the nano-silicon composite material 02 and the lithium-ion battery prepared by using the nano-silicon are respectively tested to be 6% and 13%.

It can be learned from the foregoing test that the lithium-ion battery prepared by using the foregoing nano-silicon composite material 02 improves the cycle performance of the electrochemical cell and reduce the expansion rate. This is mainly because the core 10 using the nano-silicon composite material 02 includes a nano-silicon crystal, and the nano-silicon crystal has a small size, so that volume expansion can be reduced. In addition, the first coating layer 20 of the nano-silicon composite material 02 is of a porous structure, and can perform a buffer function when the core 10 expands and shrinks, to maintain stability of the structure, reduce volume expansion, and improve cycle performance of the electrochemical cell. On this basis, the second coating layer 30 of the nano-silicon composite material 02 can block an electrolyte, reduce or eliminate a side reaction between the electrolyte and silicon, and can also improve cycle performance of an electrochemical cell.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A nano-silicon composite material comprising:
a core comprising a nano-silicon crystal;
a first coating layer covering a surface of the core, wherein the first coating layer has a porous structure, and a material of the first coating layer comprises bisilicate and silicon oxide in the deoxidized state; and
a second coating layer covering a surface of the first coating layer, wherein a material of the second coating layer comprises silicon dioxide in the deoxidized state.

2. The nano-silicon composite material according to claim 1, wherein a particle size of the nano-silicon composite material is 10 nm to 150 nm.

3. The nano-silicon composite material according to claim 1, wherein a particle size of the core is 10 nm to 130 nm.

4. The nano-silicon composite material according to claim 1, wherein a thickness of the first coating layer is 0.1 nm to 10 nm.

5. The nano-silicon composite material according to claim 1, wherein a thickness of the second coating layer is 0.1 nm to 10 nm.

6. The nano-silicon composite material according to claim 1, wherein a proportion of mass of the nano-silicon crystal to mass of the nano-silicon composite material is 70% to 85%.

7. The nano-silicon composite material according to claim 1, wherein a proportion a of mass of the bisilicate to mass of the nano-silicon composite material meets $0\% < a \leq 7.5\%$.

8. The nano-silicon composite material according to claim 1, wherein a proportion b of mass of the silicon oxide to mass of the nano-silicon composite material meets $0\% < b \leq 7.5\%$.

9. The nano-silicon composite material according to claim 1, wherein a proportion c of mass of the silicon dioxide to mass of the nano-silicon composite material meets $0\% < c \leq 15\%$.

10. The nano-silicon composite material according to claim 1, wherein the bisilicate comprises lithium metasilicate.

11. An electrode material comprising: a mixture of the nano-silicon composite material according to claim 1, graphite, and carbon.

12. The electrode material according to claim 11, wherein a proportion of mass of the nano-silicon composite material to mass of the electrode material is 3% to 60%.

13. A battery, comprising: an electrochemical cell, a corresponding connecting accessory, and a circuit, wherein the electrochemical cell comprises an anode, a cathode, an electrolyte, and a separator, and the cathode comprises the electrode material according to claim 11.

14. The nano-silicon composite material according to claim 1, wherein the first coating layer forms a buffer when the core expands or shrinks to alleviate internal stress of the core.

15. The nano-silicon composite material according to claim 1, wherein:

a chemical formula of the silicon oxide in the deoxidized state is $SiO_{1-m}$, where $0<m<1$; and a chemical formula of the silicon dioxide in the deoxidized state is $SiO_n$, where $1<n<2$.

16. A preparation method of a nano-silicon composite material, the preparation method comprising:

performing processing on silicon oxide and a metal source to obtain a mixture of nano-silicon, bisilicate, and silicon oxide in the deoxidized state; and performing acid cleaning on and grinding the mixture of the nano-silicon, the bisilicate, and the silicon oxide in the deoxidized state to obtain the nano-silicon composite material, wherein the nano-silicon composite material comprises a core, a first coating layer covers a surface of the core, and a second coating layer covers a surface of the first coating layer, the core comprises a nano-silicon crystal, the first coating layer has a porous structure, a material of the first coating layer comprises bisilicate and the silicon oxide in the deoxidized state, and a material of the second coating layer comprises silicon dioxide in the deoxidized state.

17. The preparation method of the nano-silicon composite material according to claim 16, wherein the performing of the processing on the silicon oxide and the metal source comprises:

evenly mixing the silicon oxide and the metal source in a solid state at a first preset ratio, or introducing the metal source in a vapor state into the silicon oxide at a second preset ratio, and performing roasting in a furnace in an inert atmosphere or a reducing atmosphere.

18. The preparation method of the nano-silicon composite material according to claim 17, wherein a temperature of the furnace for performing the roasting is 300° C. to 900° C.

19. The preparation method of the nano-silicon composite material according to claim 17, wherein the first preset ratio is a molar ratio that is of a metal element in the metal source to a silicon element in the silicon oxide and that is 0.1 to 1.0, and the second preset ratio is the molar ratio that is of the metal element in the metal source to the silicon element in the silicon oxide and that is 0.1 to 1.0.

20. The preparation method of the nano-silicon composite material according to claim 17, wherein the metal source comprises a lithium source, and the lithium source comprises metal lithium or a lithium salt.

21. The preparation method of a nano-silicon composite material according to claim 16, wherein the metal source is an organic solvent containing a metal ion; and the performing of the processing on the silicon oxide and the metal source comprises:

mixing, at a preset ratio, the silicon oxide and the organic solvent containing the metal ion, and reacting in an inert atmosphere or a reducing atmosphere, wherein a reaction temperature is less than 200° C.; and cleaning and drying a reaction product.

22. The preparation method of the nano-silicon composite material according to claim 21, wherein the organic solvent containing the metal ion comprises an organic solvent containing a lithium ion.

* * * * *